US006992829B1

(12) United States Patent
Jennings et al.

(10) Patent No.: US 6,992,829 B1
(45) Date of Patent: Jan. 31, 2006

(54) APPARATUS FOR DIRECTING ELECTROMAGNETIC RADIATION

(75) Inventors: Martyn R Jennings, Bristol (GB); Lee D Miller, Bristol (GB)

(73) Assignee: MBDA UK Limited, Hertfordshire (GB)

( * ) Notice: Subject to any disclaimer, the term of this patent is extended or adjusted under 35 U.S.C. 154(b) by 548 days.

(21) Appl. No.: 10/247,846

(22) Filed: Sep. 18, 2002

(30) Foreign Application Priority Data

Sep. 19, 2001 (GB) .................................... 0123640

(51) Int. Cl.
*G02B 27/10* (2006.01)

(52) U.S. Cl. ........................... 359/618; 359/298; 385/4

(58) Field of Classification Search ................ 359/349, 359/618, 298; 385/4
See application file for complete search history.

(56) References Cited

U.S. PATENT DOCUMENTS

| | | | | |
|---|---|---|---|---|
| 3,953,131 | A | 4/1976 | Britz | |
| 3,958,229 | A | 5/1976 | Duguay | |
| 4,296,319 | A | 10/1981 | Franks et al. | |
| 4,442,550 | A | 4/1984 | Killat | |
| 5,013,151 | A | 5/1991 | Hughes | |
| 5,109,459 | A | 4/1992 | Eibert et al. | |
| 5,178,617 | A | 1/1993 | Kuizenga et al. | |
| 5,214,729 | A | 5/1993 | Koai | |
| 5,446,571 | A | 8/1995 | Shabeer | |
| 5,703,708 | A | 12/1997 | Das et al. | |
| 5,784,098 | A | 7/1998 | Shoji et al. | |
| 5,953,142 | A | 9/1999 | Chiaroni et al. | |
| 6,697,192 | B1 * | 2/2004 | Fan et al. | 359/349 |
| 6,731,829 | B2 * | 5/2004 | Ionov | 385/15 |
| 6,760,512 | B2 * | 7/2004 | Pepper | 385/27 |

FOREIGN PATENT DOCUMENTS

| | | |
|---|---|---|
| EP | 0 034 107 | 8/1981 |
| EP | 0 398 038 | 11/1990 |
| EP | 0 905 937 | 3/1999 |
| EP | 0 938 197 | 8/1999 |
| EP | 1 037 413 | 9/2000 |
| EP | 1 099 965 | 5/2001 |
| GB | 2 039 381 | 8/1980 |
| WO | WO 91/14321 | 9/1991 |
| WO | WO 00/11765 | 3/2000 |

* cited by examiner

*Primary Examiner*—Mark Hellner
(74) *Attorney, Agent, or Firm*—Nixon & Vanderhye P.C.

(57) ABSTRACT

Apparatus for directing electromagnetic radiation (EMR) comprising an EMR source for producing discrete pulses of radiation, an EMR splitter, the EMR splitter providing a plurality of EMR transmission paths for received pulses, the EMR transmission paths terminating in an array, and optical means for receiving EMR emanating from the array and for directing said EMR.

25 Claims, 4 Drawing Sheets

APPARATUS FOR DIRECTING ELECTROMAGNETIC RADIATION

This invention relates to the field of directing electromagnetic radiation.

The directing of electromagnetic pulses by using mechanical methods is known in the arts of communications and sensor systems. Such techniques include physically moving either the electromagnetic radiation source or a component in the path of the radiation, such as a mirror, to enable the pointing of a beam in a variety of directions.

A problem with this mechanical method of beam pointing, where the electromagnetic radiation source transmitter is physically moved to direct the beam, is that it takes a finite time to move the apparatus and thereby direct the beam. For applications where a very high scan rate is needed, this technique is too slow to provide a sufficient scan rate.

Accordingly there is provided apparatus for directing electromagnetic radiation (EMR) comprising, an EMR source for producing discrete pulses of radiation, an EMR splitter, the EMR splitter providing a plurality of EMR transmission paths for received pulses, the EMR transmission paths terminating in an array, and optical means for receiving EMR emanating from the array and for directing said EMR.

In some circumstances it may be desirable to provide an EMR combiner to recombine at least two of said plurality of EMR transmission paths prior to the termination of the combined transmission paths in an array. Such circumstances may arise, for example, when the beams of EMR need to be coded.

Examples of some preferred embodiments of the invention will now be disclosed by way of example only and with reference to the following drawings in which.

Figure 1:
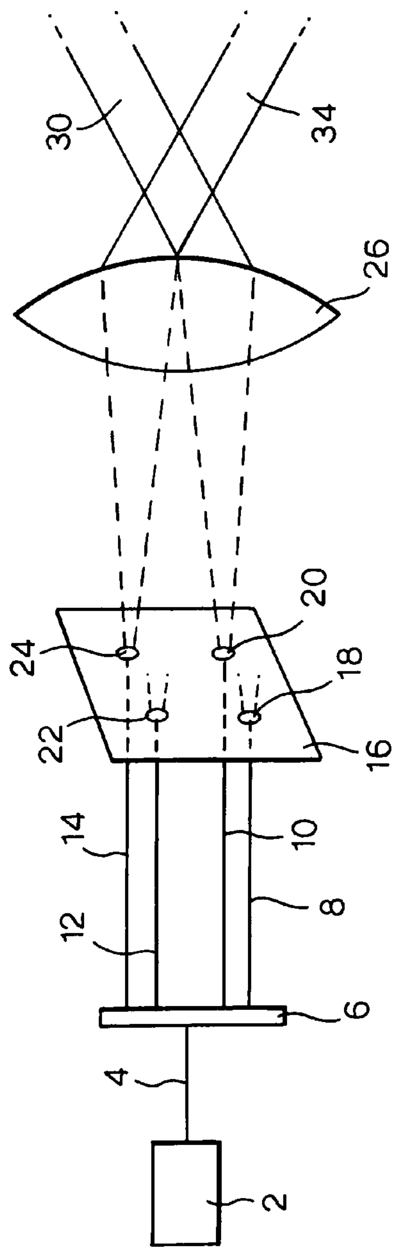
FIG. 1 shows a first embodiment of apparatus for directing electromagnetic radiation according to the present invention.

In FIG. 1 a radiation source 2 is shown connected to an EMR splitter 6 via an optical fibre link 4. A radiation pulse generated by the radiation source 2 is transmitted via the optical fibre 4 to the splitter 6 wherein the pulse energy is distributed throughout four optical fibres (8, 10, 12, 14). The optical fibres 8, 10 12, 14 terminate in an array 16. The array 16 illustrated is shown as a 2×2, but could equally be of any matrix shape (including regular and irregular shapes), any pattern (including uniform or non-uniform density of fibre ends), and any size as required. For example, if the required matrix size was 3×3, then nine optical fibres extending from the splitter 6 and terminating in the array 16 would be needed. The ends of the fibres 18, 20, 22, 24 are held in the array in a fixed position. The array 16 is positioned behind a lens 26. The lens 26 has optical characteristics which provide for light emitted from the ends of the fibres 18, 20, 22, 24 to be resolved into corresponding directed beams 28, 30, 32, 34 (of which 30 and 34 only are shown for clarity). The lens may be refractive or reflective. Alternatively, other optical means such as mirrors, gratings or similar optical devices suitable for directing EMR could be used in place of the lens. The ends of the fibres 18, 20, 22, 24 are positioned carefully relative to the lens 26, as the different spatial locations of the fibre ends making up the array 16 correspond to different transmitted beam angles. In use, the fibre ends and the lens remain fixed in position, so no time is spent on mechanical movements.

In this example, the fibres 8, 10, 12, 14 are of the same length, so the EMR is emitted from the ends of the fibres 18, 20, 22, 24 at the same time. This provides illumination over the whole field of view of the target area. To code each of the beams 28, 30, 32, 34, the material properties of each of the fibres 8, 10, 12, 14 may be altered, for example by doping to provide a frequency shift. Coding each of the beams allows any reflected or scattered signal to be easily identified so that the user may establish from which fibre the signal emanated and therefore the direction in which the original signal was transmitted.

Figure 2:
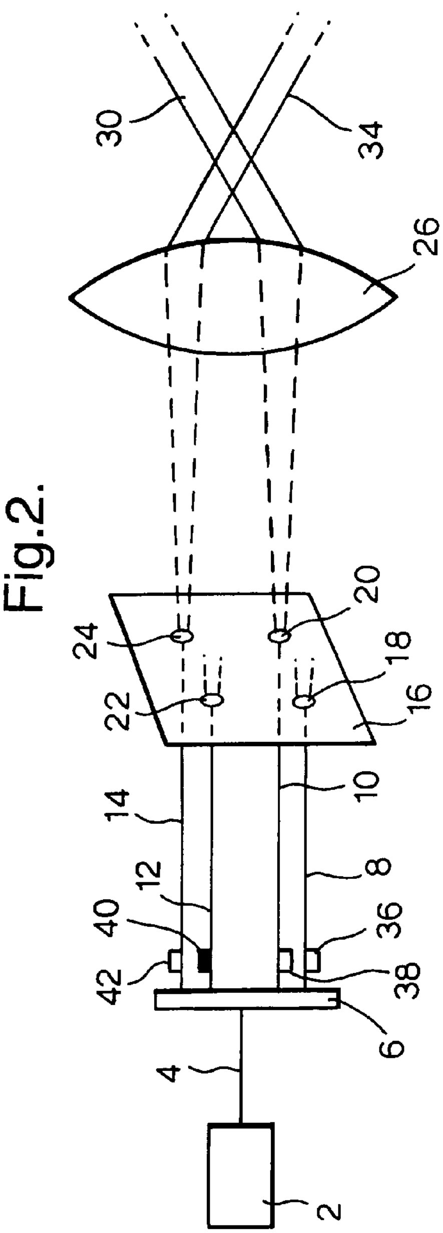
FIG. 2 shows the apparatus of FIG. 1 modified to permit partial illumination of the field of view.

Sometimes it may be desirable to illuminate only part of the field-of-view or field-of-regard of the array. In this case, the apparatus of FIG. 2 may be utilised. This apparatus is the same as that shown in FIG. 1, except that each of the optical fibres 8, 10, 12, 14 further compromise a switch, shown in FIG. 2 as 36, 38, 40, 42 respectively. The switches may be mechanical switches or alternatively may be photonic switches. The switches are utilised to enable or to prevent EMR from travelling along the optical fibres. For example, FIG. 2 shows switches 36, 38 and 42 configured to allow EMR to travel along optical fibres 8, 10, 14 and beams 28, 30, 34 emanate from the ends of the fibres 18, 20, 24 respectively (of which only beams 30 and 34 are shown for clarity). However switch 40 is configured to prevent EMR from travelling along optical fibre 12, and therefore no beam emanates from the end of fibre 22. The switches may be activated directly by a user of the apparatus or may be activated by a computer following pre-set instructions, and the switches may be activated locally or remotely.

Figure 3:
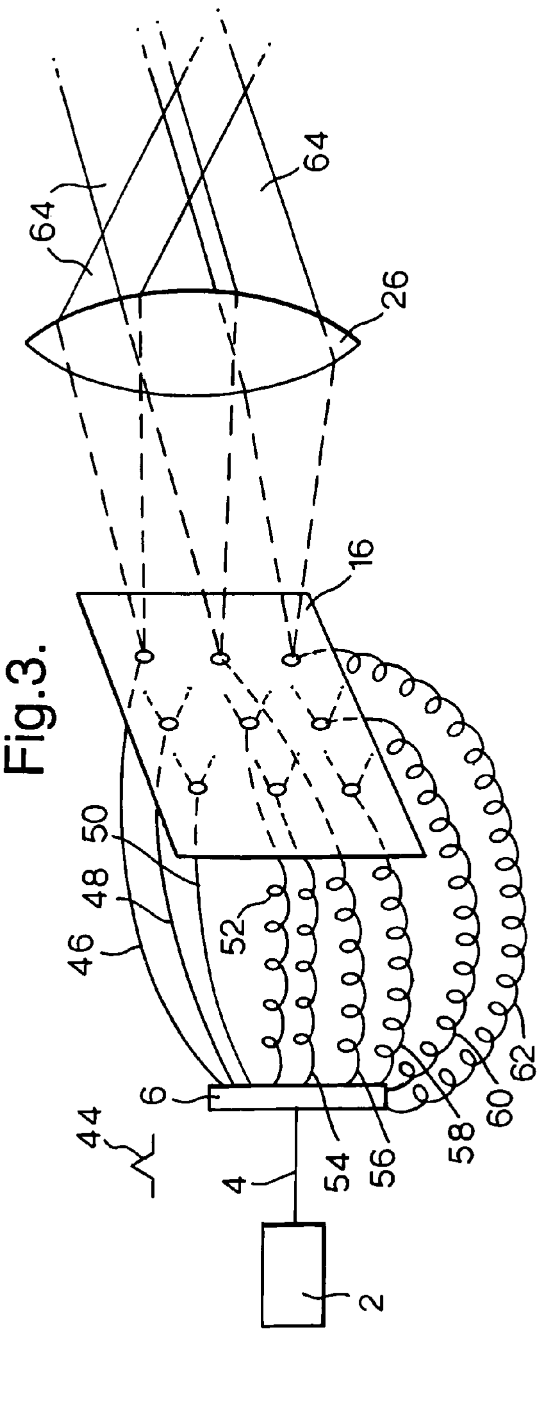
FIG. 3 shows a second embodiment of apparatus for directing electromagnetic radiation according to the present invention.

FIG. 3 shows a radiation source 2 connected to an EMR splitter 6 via an optical fibre link 4 as before. A radiation pulse 44 generated by the radiation source 2 is transmitted via the optical fibre 4 to the splitter 6 wherein the pulse energy is distributed throughout nine optical fibres (46, 48, 50, 52, 54, 56, 58, 60, 62), the fibres being delay lines each having different time delays, which in the example shown are created by each of said fibres having a different physical length.

In this example it is assumed that the energy of the pulse 44 incident on the splitter 6 is equally distributed amongst the 9 optical delay lines (46, 48, 50, 52, 54, 56, 58, 60, 62), each fibre thereby carrying a pulse of 1/9 the total energy of the original pulse unless a gain mechanism is employed in individual delay lines.

This feature of the example is not intended to limit the invention to such an energy distribution and accordingly pulse energy 44 incident on the splitter 6 could equally have been distributed amongst the nine delay lines in accordance with any fractional distribution regime. Such a system could thereby produce multiple pulses with varying amplitudes between adjacent pulses.

Further encoding of pulses may be achieved by utilising optical fibre having different characteristics such as variations in the fibre refractive index, or adding elements to the optical fibres which change the state of photons passing through.

Encoding of pulses allows the user to be certain that the return pulses received (for example those reflected off a target) are indeed the returns of those pulses that were transmitted.

As described with reference to FIGS. 1 and 2, the ends of the optical fibres terminate in an array 16. The array 16 of FIG. 3 is a 3×3 array, but the matrix shape, pattern or size could be different if required. As before, EMR is emitted from the ends of the optical fibres, and is received and directed by the lens 26. As described above, the ends of the optical fibres are carefully positioned in the array, and neither the array nor the lens is moved during use.

In use, a pulse 44 is produced by the EMR source 2 and is transmitted to the EMR splitter 6 via a transmission line 4. The EMR splitter 6 divides the pulses received from the EMR source 2 amongst the nine fibre optic delay lines, the system thereby producing a sequence of nine individual beams of EMR energy 64 for every one radiation pulse 44 generated by the EMR source 2. Each pulse of the sequence 64 arrives at the array 16 at a different time due to the different lengths of the optical fibres. Therefore, the array 16 provides a scanner having an optical scanning capability orders of magnitude faster than is possible using conventional techniques.

In an example, if a 10 kHz pulse rate frequency laser was used as the source 2 and connected to the fibre end array 16 and the delay between neighbouring fibres was set at 10 ns, then using a raster scan pattern a full scan of all nine fibre ends with resultant beam formations would be achieved in 80 ns. There would then be a delay of almost 100 microseconds before the next scan commences (i.e. a 10 kHz laser source 2) thereby increasing the pulse rate frequency by a factor of 10,000 for a short interval of time.

The array could be of any matrix shape, pattern or size as required, providing for a wide variety of scan patterns, including but not limited to raster scan patterns (i.e. with no requirement for scan fly-back), and patterns such as spiral scan.

Figure 4:
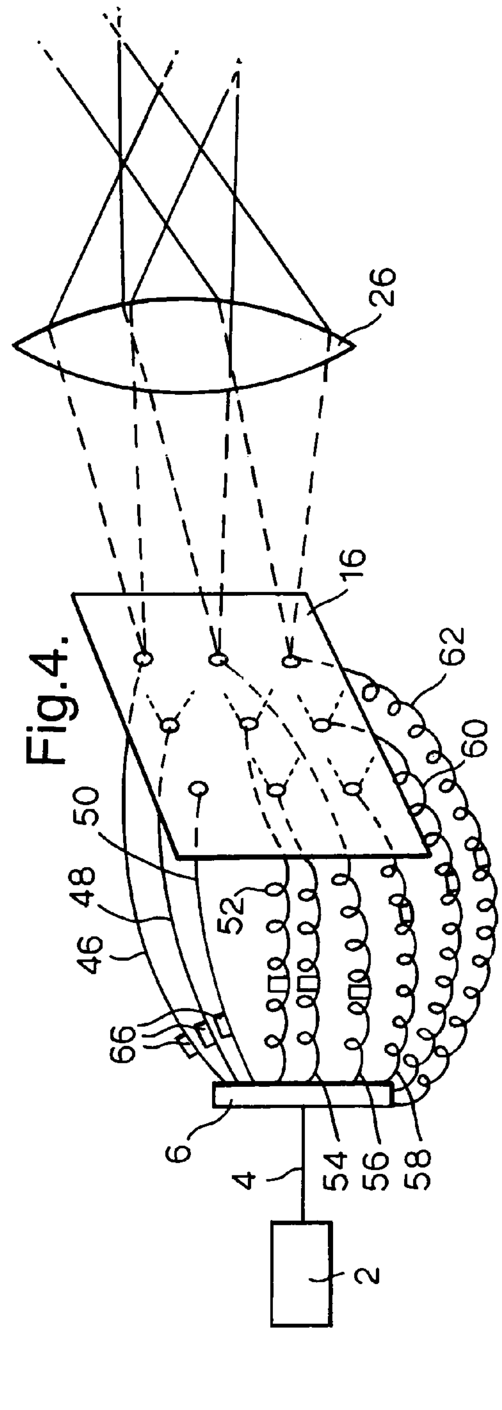
FIG. 4 shows the apparatus of FIG. 3 modified to permit partial illumination of the field of view.

FIG. 4 shows apparatus similar to that of FIG. 3, with the addition of switches 66 on each of the optical fibres (46, 48, 50, 52, 54, 56, 58, 60, 62). The switches can be used to prevent EMR from travelling along the corresponding optical fibre, and can thereby be used to alter the scan pattern of the apparatus, and to limit the illumination to a particular part of the target area.

Figure 5:
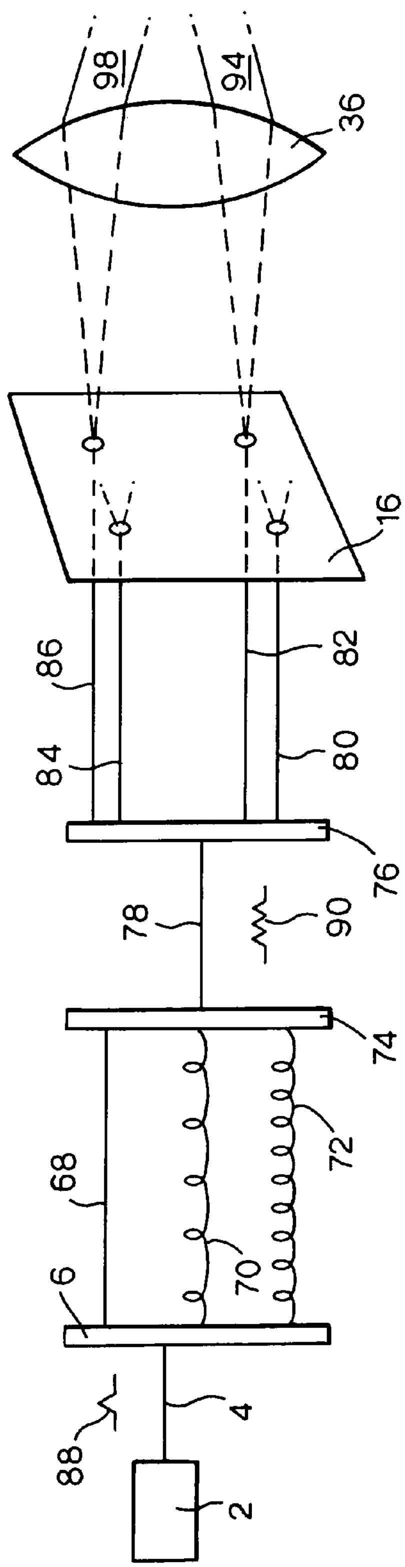
FIG. 5 shows a third embodiment of apparatus for directing electromagnetic radiation according to the present invention.

FIG. 5 shows a radiation source 2 connected to a first EMR splitter 6 via an optical fibre link 4. The EMR splitter 6 comprises three optical fibres (68, 70, 72) each having a different length. The optical fibres lead to an EMR combiner 74 which is linked to a second EMR splitter 76 via a combined EMR transmission line 78. The second EMR splitter 76 comprises four optical fibres (80, 82, 84, 86) having the same length, the free ends of the fibres being held in an array 16.

In use, the radiation source 2 produces a pulse 88 which is transmitted via the optical fibre 4 to the first EMR splitter 6, wherein the pulse energy is distributed throughout the three optical fibre delay lines (68, 70, 72). The three optical fibres have different characteristics, here shown as physical length, so that the original pulse 88 is converted into a pulse train. The differences in delay between fibres (68, 70, 72) provide a pulse train coding. The pulses carried by each of the optical fibre delay lines (68, 70, 72) are recombined in the EMR combiner 74 to form a pulse train 90 which is transmitted via the EMR transmission line 78 to the second EMR splitter 76. As the four optical fibres (80, 82, 84, 86) of the second EMR splitter 76 are the same length, the pulse train 90 is emitted from the array ends of the four optical fibres (80, 82, 84, 86) simultaneously. The array 16 is positioned behind a lens 36, the lens having optical characteristics which allow light emitted from each fibre end of the array to be resolved into corresponding directed beams (92, 94, 96, 98), of which only 94 and 98 are shown for clarity. Such an arrangement is a staring array rather than a scanning array, as the beams are used to simultaneously illuminate the target area although each beam is now encoded. Switches may be used as described earlier to prevent beams emanating from desired optical fibres of the second EMR splitter 76. Switches may also be used on the fibres (68, 70, 72) of the first EMR splitter 6 to change the coding of the pulse train 90.

Figure 6:
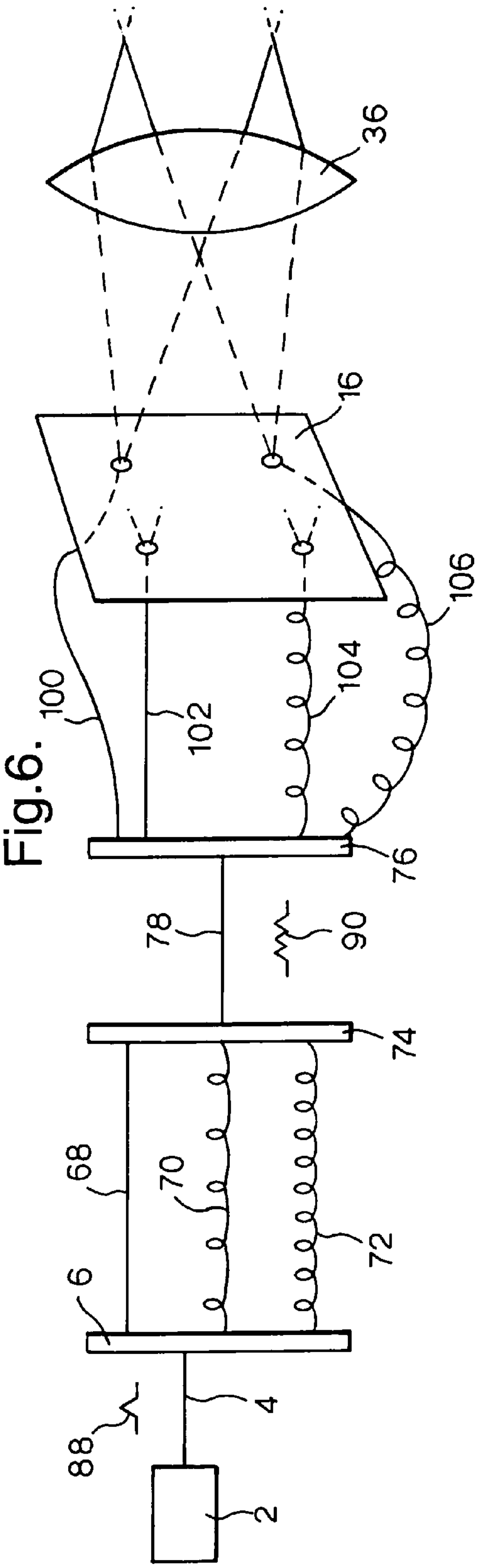
FIG. 6 shows the apparatus of FIG. 5 modified to permit scanning of the field of view.

FIG. 6 shows apparatus similar to that of FIG. 5 except that the optical fibres (100, 102, 104, 106) of the second EMR splitter 76 are of different lengths. This causes the coded pulse train 90 to be emitted from the ends of the fibres (100, 102, 104, 106) at different times, thereby creating a rapid scanning system as described with respect to FIG. 3. Again, switches could be used to vary the scan pattern or to vary the coded pulses.

Figure 7:
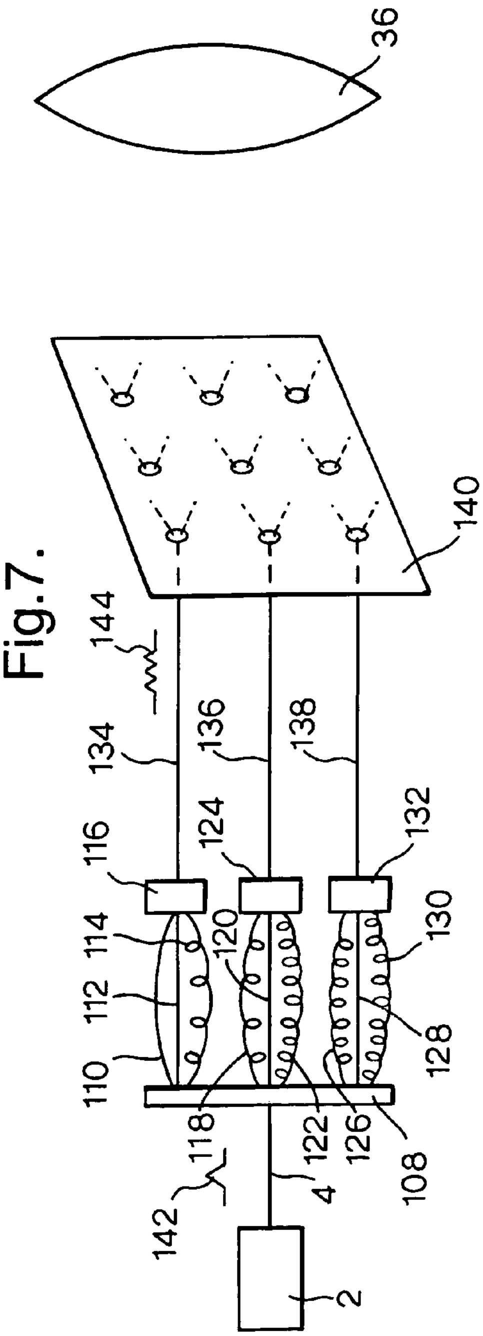
FIG. 7 shows a fourth embodiment of apparatus for directing electromagnetic radiation according to the present invention.

FIG. 7 shows an EMR source 2 connected to an EMR splitter 108 via an EMR transmission line 4. The EMR splitter 108 comprises a plurality of fibre optic cables, of which nine are shown for clarity. Fibre optic cables 110, 112, 114 extend from the EMR splitter 108 to an EMR combiner 116. Fibre optic cables 118, 120, 122 extend from the EMR splitter 108 to an EMR combiner 124, and fibre optic cables 126, 128, 130 extend from the EMR splitter 108 to an EMR combiner 132. Fibre optic transmission lines 134, 136, 138 extend from the EMR combiners 116, 124, 132 respectively to form part of an array 140. The array may be a 3×3 array, or may be of a different matrix shape or pattern or size if required. The ends of transmission lines 134, 136, 138 are positioned within the array such that EMR emanating from the ends of each of the transmission lines falls on a predetermined part of the lens 36.

In use, the EMR source 2 produces a pulse 142, which is transmitted to the EMR splitter 108. The EMR transmitted along optical fibres 110, 112 or 114 recombines at the EMR combiner 116 to form pulse train 144. This pulse train is emitted from optical fibre 134 of the array 140. Similarly, pulse trains are emitted from the other optical fibres 136, 138 which form part of the array 140. If the shortest lengths of optical fibres (112, 120, 128) are all the same length, and optical fibres 134, 136, 138 are all the same length, then the array will act as a staring array. If the optical fibres extending from the EMR splitter to the EMR combiner 116 are all shorter than the optical fibres which extend from the EMR splitter to the EMR combiner 124, then the array will act as a scanning array, even if the optical fibres 134, 136, 138 are all the same length.

Figure 8:
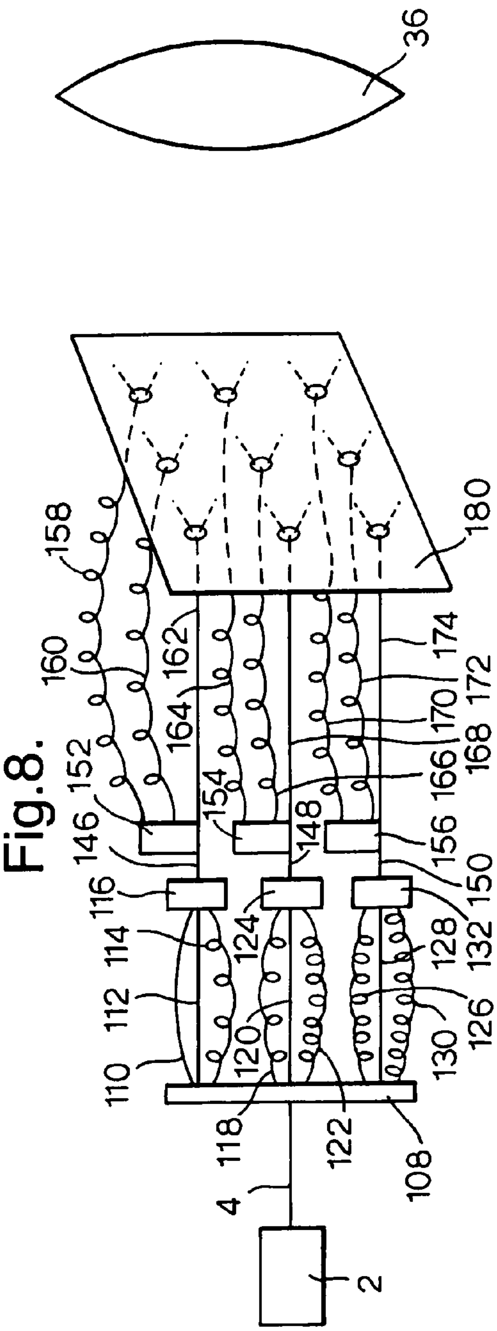
FIG. 8 shows a fifth embodiment of apparatus for directing electromagnetic radiation according to the present invention.

FIG. 8 shows a further example of a scanning array. In FIG. 8, an EMR source 2 is connected to an EMR splitter 108 via an EMR transmission line 4. The EMR splitter 108 comprises nine fibre optic cables similar to those shown in FIG. 7. Fibre optic cables 110, 112, 114 extend from the EMR splitter 108 to an EMR combiner 116. Fibre optic cables 118, 120, 122 extend from the EMR splitter 108 to an EMR combiner 124, and fibre optic cables 126, 128, 130 extend from the EMR splitter 108 to an EMR combiner 132.

Fibre optic transmission lines 146, 148, 150 extend from the EMR combiners 116, 124, 132 respectively to the second EMR splitters 152, 154, 156 respectively. The fibre optic transmission lines 158, 160, 162 extend from the EMR splitter 152 to form part of an array 180. Similarly, the fibre optic transmission lines 164, 166, 168 extend from the EMR splitter 154 to form part of the array 180, and fibre optic transmission lines 170, 172, 174 extend from the EMR splitter 156 to form part of the array 180. The ends of the transmission lines (158, 160, 162, 164, 166, 168, 170, 172, 174) are positioned within the array such that EMR emanating from the ends of each of the transmission lines falls on a predetermined part of the lens 36.

Switches may be used as described previously to prevent EMR from travelling along one or more of the fibres of the array and thus preventing these fibres of the array from illuminating a target area. Switches may also be used as described previously to prevent EMR from travelling along one or more of the optical fibres of a group such as fibres 110, 112, 114 of FIG. 7 for example. In this manner, each of the fibres 134, 136, 138 of the array may contain pulses which are coded differently. This is advantageous in determining the direction of a returned pulse reflected from a target.

It will be appreciated that the pulse trains generated using the apparatus described above may be coded using means other than changing the physical length of the cables. For example, the fibre material may be doped to produce changes in wavelength, or the fibre refractive index may be varied.

Using the apparatus described above an optical EMR pulse can be utilised to illuminate an area in front of the lens thereby providing the illumination source for a seeker or other detection system which utilises reflected EMR energy to locate an object in space.

Such coded pulses are also useful in the field of secure communications whereby the transmission and receipt of unique 'signature' pulses comprising known pulse repetition frequencies (e.g. varying or constant) and/or the inclusion of individual pulses within a multiple pulse sequence that may include one or more colours or shifts in energy level could significantly increase the security of such systems. The present invention allows different 'signature' pulses to be transmitted rapidly in different directions, thereby enabling rapid and secure communication.

Other advantages and improvements over state of the art systems will be readily apparent to those skilled in the art and such embodiments and alternative embodiments which utilise the inventive concept of the disclosure contained herein are considered included within the scope of the claimed invention.

What is claimed is:

1. Apparatus for directing electromagnetic radiation (EMR) comprising:
- an EMR source for producing discrete input pulses of electromagnetic radiation,
- a plurality of EMR transmission paths terminating in an array,
- an EMR splitter for distributing parts of each input pulse into said plurality of EMR transmission paths, and
- an optical means for:
  - receiving EMR emitted from said array,
  - collimating the received EMR into respective beams, said beams substantially parallel, and
  - directing each of said beams into free space in a direction different from other beams.

2. Apparatus, as in claim 1, in which EMR emitted from said array is encoded to identify the EMR transmission path through which each beam was transmitted.

3. Apparatus, as in claim 2, in which said EMR transmission paths are delay lines each providing different transmission delays, whereby encoding is achieved by the differing time taken for the transmission of each beam through respective EMR transmission paths.

4. Apparatus, as in claim 2, in which at least one of said EMR transmission paths modifies an EMR pulse passing therethrough relative to said input pulse.

5. Apparatus, as in claim 2, in which at least one of said EMR transmission paths includes an element for changing the state of photons passing through it.

6. Apparatus for directing electromagnetic radiation (EMR) comprising:
- an EMR source for producing discrete input pulses of electromagnetic radiation,
- a plurality of optical fibres defining respective EMR transmission paths, said optical fibres terminating in an array,
- an EMR splitter for distributing parts of each input pulse into each of said optical fibres, and
- an optical means for:
  - receiving EMR emitted from said array,
  - collimating the received EMR into respective beams, said beams substantially parallel, and
  - directing each of said beams into free space in a direction different from other beams.

7. Apparatus, as in claim 6, including encoding means to identify the optical fibre through which each beam of the emitted EMR was transmitted.

8. Apparatus, as in claim 6, in which said optical fibres are doped to provide different frequency shifts identifying the optical fibre through which each beam of the emitted EMR was transmitted.

9. Apparatus, as in claim 6, in which said optical fibres are delay lines providing different transmission delays which identify the optical fibre through which each beam of the emitted EMR was transmitted.

10. Apparatus, as in claim 6, in which said optical fibres are of different lengths to cause different transmission delays which identify the optical fibre through which each beam of the emitted EMR was transmitted.

11. Apparatus, as in claim 6, in which said optical fibres are formed from materials having different refractive indices to identify the optical fibre through which each beam of the emitted EMR was transmitted.

12. Apparatus, as in claim 6, in which a switching means is arranged to enable or disable at least one of said EMR transmission paths.

13. Apparatus as in claim 1, in which said EMR transmission paths include an EMR combiner which is arranged to recombine at least two of said pulses along said EMR transmission path to form a pulse train, and a second EMR splitter for distributing parts of said pulse train to said array.

14. A method of directing electromagnetic radiation (EMR) comprising the steps of:
- producing discrete pulses of radiation using an EMR source;
- providing a plurality of EMR transmission paths, said paths terminating in an array;
- receiving with an EMR splitter pulses produced by said EMR source;
- distributing each of said received pulses into a plurality of EMR transmission paths;

collimating EMR pulses from each of said EMR transmission path, said collimated EMR pulses comprising beams in substantially parallel rays; and directing each of said beams into free space in a direction different from each other beam.

15. A method, as in claim 14, including the further step of encoding EMR emitted from the array corresponding to the EMR transmission path so each beam is coded differently from each other beam.

16. Apparatus for directing electromagnetic radiation (EMR) comprising:

an EMR source for producing discrete input pulses of electromagnetic radiation, a plurality of EMR transmission paths terminating in an array, an EMR splitter for distributing parts of each input pulse into said plurality of EMR transmission paths, and an optical means for:

receiving EMR emitted from said array, and directing said EMR into free space at different beam angles, in which EMR emitted from said array is encoded to identify the EMR transmission path through which the respective part of said input pulse was transmitted to said array.

17. Apparatus, as in claim 16, in which said EMR transmission paths are delay lines each providing different transmission delays, whereby encoding is achieved by the differing time taken for the transmission of each of said parts of said input pulses through its respective EMR transmission path.

18. Apparatus, as in claim 16, in which at least one of said EMR transmission paths is arranged to modify the part of an EMR pulse passing therethrough relative to said input pulse.

19. Apparatus, as in claim 16, in which at least one of said EMR transmission paths includes an element for changing the state of photons passing through it.

20. Apparatus for directing electromagnetic radiation (EMR) comprising:

an EMR source for producing discrete input pulses of electromagnetic radiation, a plurality of optical fibres defining respective EMR transmission paths, said optical fibres terminating in an array, an EMR splitter for distributing parts of each input pulse into each of said optical fibres, and an optical means for:

receiving EMR emitted from said array, directing said EMR into free space at different beam angles, and encoding means to identify the optical fibre through which each part of said input pulse was transmitted.

21. Apparatus, as in claim 20, in which said optical fibres are doped to provide different frequency shifts identifying the optical fibre through which each part of said input pulse was transmitted.

22. Apparatus, as in claim 20, in which said optical fibres are delay lines providing different transmission delays which identify the optical fibre through which each part of said input pulse was transmitted.

23. Apparatus, as in claim 20, in which said optical fibres are of different lengths to cause different transmission delays which identify the optical fibre through which each part of said input pulse was transmitted.

24. Apparatus, as in claim 20, in which said optical fibres are formed from materials having different refractive indices to identify the optical fibre through which each part of the input pulse was transmitted.

25. Apparatus, as in claim 20, in which a switching means is arranged to enable or disable at least one of said EMR transmission paths.

* * * * *